(12) United States Patent
Poosamani

(10) Patent No.: US 12,301,748 B2
(45) Date of Patent: May 13, 2025

(54) SYSTEM AND METHOD FOR SIMULTANEOUS MULTI-CALL SUPPORT CAPABILITY ON COMPATIBLE AUDIO DEVICES

(71) Applicant: Samsung Electronics Co., Ltd., Suwon-si (KR)

(72) Inventor: Nithyananthan Poosamani, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 17/649,638

(22) Filed: Feb. 1, 2022

(65) Prior Publication Data

US 2022/0256028 A1    Aug. 11, 2022

Related U.S. Application Data

(60) Provisional application No. 63/146,860, filed on Feb. 8, 2021.

(51) Int. Cl.
| | |
|---|---|
| *H04M 1/72409* | (2021.01) |
| *H04W 4/06* | (2009.01) |
| *H04W 72/121* | (2023.01) |
| *H04W 76/15* | (2018.01) |

(52) U.S. Cl.
CPC ....... *H04M 1/724094* (2022.02); *H04W 4/06* (2013.01); *H04W 72/121* (2013.01); *H04W 76/15* (2018.02)

(58) Field of Classification Search
CPC ......... H04M 2250/62; H04M 1/72412; H04M 1/6066; H04W 4/06; H04W 4/08; H04W 4/16; H04W 88/06; H04W 72/121; H04W 76/15

See application file for complete search history.

(56) References Cited

U.S. PATENT DOCUMENTS

| | | | | |
|---|---|---|---|---|
| 6,155,519 | A * | 12/2000 | Rajasingham | B64D 11/0638 244/118.6 |
| 7,046,789 | B1 * | 5/2006 | Anderson | H04M 3/5175 379/266.07 |
| 7,242,969 | B2 * | 7/2007 | Kuramatsu | H04M 1/0245 455/567 |
| 7,668,308 | B1 * | 2/2010 | Wurtz | H04R 3/00 379/430 |
| 8,036,343 | B2 * | 10/2011 | Schulein | H04M 1/6066 379/52 |

(Continued)

FOREIGN PATENT DOCUMENTS

| | | |
|---|---|---|
| CN | 105812312 A | 7/2016 |
| CN | 107295151 A | 10/2017 |

*Primary Examiner* — Dung B Huynh

(57) ABSTRACT

A system and method are provided for multi-call communications for audio communication. The system includes one or more control devices (CDs) wherein a target CD is coupled to one HD and other CDs are coupled to a plurality of HDs. The method also includes connecting a first control device (CD) coupled with a first hearing device (HD) to a plurality of call groups, each call group comprising a second CD and a plurality of HDs. The method also includes directing a call channel stream to the first HD coupled to the first CD, the call channel stream selected from the plurality of call groups.

20 Claims, 7 Drawing Sheets

(56) References Cited

U.S. PATENT DOCUMENTS

| | | | | |
|---|---|---|---|---|
| 8,320,578 | B2* | 11/2012 | Kahn | H04M 1/6066 381/309 |
| RE43,872 | E* | 12/2012 | Trip | H04M 1/6066 379/430 |
| 8,615,221 | B1* | 12/2013 | Cosenza | H04M 3/42 709/224 |
| 9,325,828 | B1* | 4/2016 | Oh | H04M 1/72454 |
| 10,341,796 | B2* | 7/2019 | Norris | H04S 1/007 |
| 10,432,773 | B1* | 10/2019 | Tong | H04R 1/1041 |
| 10,455,394 | B1* | 10/2019 | Sheeley | H04W 4/80 |
| 10,708,706 | B1* | 7/2020 | Brimijoin | G06F 3/167 |
| 10,735,665 | B2* | 8/2020 | Iyer | H04N 23/74 |
| 10,757,240 | B1* | 8/2020 | Hvidsten | G06F 3/167 |
| 10,813,700 | B2* | 10/2020 | Amanatullah | A61B 90/361 |
| 10,848,868 | B2* | 11/2020 | Gupta | G06F 3/0482 |
| 10,904,486 | B2 | 1/2021 | Van Os et al. | |
| 11,109,138 | B2* | 8/2021 | Gong | H04M 1/6066 |
| 11,202,151 | B2* | 12/2021 | Bal | H04R 3/12 |
| 11,222,523 | B2* | 1/2022 | Johan | H04M 7/1205 |
| 11,227,481 | B1* | 1/2022 | Bran | G08B 21/245 |
| 11,272,048 | B1* | 3/2022 | Wesselman | H04M 1/6066 |
| 11,375,058 | B2* | 6/2022 | Kuzhiyil | H04M 1/72442 |
| 11,625,222 | B2* | 4/2023 | Satongar | G06F 3/165 704/200 |
| 11,735,187 | B2* | 8/2023 | Lukens | G10L 15/26 704/270.1 |
| 11,768,528 | B2* | 9/2023 | Blair | G06F 1/26 713/2 |
| 11,812,485 | B2* | 11/2023 | Huang | H04W 76/14 |
| 11,863,907 | B1* | 1/2024 | Goetzinger | H04L 65/1086 |
| 12,063,275 | B2* | 8/2024 | Kuehnl | H04L 67/535 |
| 2002/0001317 | A1* | 1/2002 | Herring | H04W 76/15 370/352 |
| 2002/0094067 | A1* | 7/2002 | August | G10L 13/00 704/E15.044 |
| 2003/0002644 | A1* | 1/2003 | Guccione | H04M 3/56 379/202.01 |
| 2003/0161292 | A1* | 8/2003 | Silvester | H04W 12/50 370/349 |
| 2004/0131175 | A1* | 7/2004 | Rogalski | H04M 19/041 379/373.02 |
| 2004/0157555 | A1* | 8/2004 | Richenstein | H04R 5/04 455/39 |
| 2004/0204194 | A1* | 10/2004 | Akai | H04M 1/03 455/350 |
| 2004/0209569 | A1* | 10/2004 | Heinonen | H04M 1/725 455/3.01 |
| 2005/0207590 | A1* | 9/2005 | Niehoff | H04R 27/00 381/79 |
| 2005/0271194 | A1* | 12/2005 | Woods | H04M 3/56 455/518 |
| 2005/0282592 | A1* | 12/2005 | Frerking | H04R 1/1091 455/575.2 |
| 2006/0126821 | A1* | 6/2006 | Sahashi | H04M 3/51 379/430 |
| 2006/0165243 | A1* | 7/2006 | Lee | H04R 1/1091 381/384 |
| 2007/0042762 | A1* | 2/2007 | Guccione | H04M 1/72412 455/416 |
| 2008/0056472 | A1* | 3/2008 | Tanemura | H04M 1/6058 379/201.01 |
| 2008/0080719 | A1* | 4/2008 | Ahn | H04M 1/6066 381/17 |
| 2008/0160977 | A1* | 7/2008 | Ahmaniemi | H04W 4/02 709/204 |
| 2008/0200159 | A1* | 8/2008 | Lai | H04M 1/6066 455/416 |
| 2008/0276174 | A1* | 11/2008 | Hintermeister | H04N 21/8456 715/720 |
| 2008/0280561 | A1* | 11/2008 | Lin | H04M 1/05 455/41.2 |
| 2008/0299948 | A1* | 12/2008 | Rosener | H04M 1/6066 455/412.2 |
| 2008/0318518 | A1* | 12/2008 | Coutinho | H04H 20/62 455/3.06 |
| 2009/0010441 | A1* | 1/2009 | Pallone | H04M 3/568 381/2 |
| 2009/0023417 | A1* | 1/2009 | Davis | H04M 1/72513 455/403 |
| 2009/0068949 | A1* | 3/2009 | Lin | H04R 1/1033 455/41.3 |
| 2009/0080632 | A1* | 3/2009 | Zhang | H04M 3/56 379/202.01 |
| 2009/0124286 | A1* | 5/2009 | Hellfalk | H04M 1/6058 455/556.1 |
| 2009/0207013 | A1* | 8/2009 | Ayed | G08B 21/0277 340/539.1 |
| 2009/0245550 | A1* | 10/2009 | Dai | H04R 1/1041 381/311 |
| 2009/0247245 | A1* | 10/2009 | Strawn | H04N 7/142 704/E15.001 |
| 2009/0259472 | A1* | 10/2009 | Schroeter | G10L 13/00 704/260 |
| 2009/0305632 | A1* | 12/2009 | Sarkissian | H04L 67/54 455/41.2 |
| 2009/0312068 | A1* | 12/2009 | Kuo | H04M 1/72448 455/569.1 |
| 2010/0020955 | A1* | 1/2010 | Wengrovitz | H04M 3/56 379/202.01 |
| 2010/0062713 | A1* | 3/2010 | Blamey | H04M 9/082 455/41.3 |
| 2010/0081418 | A1* | 4/2010 | Chiashi | H04M 1/667 455/414.1 |
| 2010/0151915 | A1* | 6/2010 | Huisken | H04M 1/6505 455/567 |
| 2010/0197361 | A1* | 8/2010 | Choi | H04M 3/436 455/569.1 |
| 2010/0210212 | A1* | 8/2010 | Sato | H04B 5/20 455/41.3 |
| 2010/0217836 | A1* | 8/2010 | Rofougaran | H04M 1/04 709/218 |
| 2010/0217912 | A1* | 8/2010 | Rofougaran | H04M 1/72409 709/218 |
| 2010/0240417 | A1* | 9/2010 | Wickman | H04W 52/027 455/566 |
| 2010/0271983 | A1* | 10/2010 | Bryant | H04B 1/385 370/352 |
| 2011/0054647 | A1* | 3/2011 | Chipchase | H04M 3/53366 455/566 |
| 2011/0085686 | A1* | 4/2011 | Bhandari | H04R 3/005 381/313 |
| 2011/0117843 | A1* | 5/2011 | Kim | H04M 1/72412 455/41.2 |
| 2011/0128452 | A1* | 6/2011 | Kim | H04N 21/43615 348/E5.125 |
| 2011/0185286 | A1* | 7/2011 | Moyers | H04L 12/1827 715/752 |
| 2012/0094714 | A1* | 4/2012 | Yoshikawa | H04M 1/72454 455/556.1 |
| 2012/0102399 | A1* | 4/2012 | Nicholson | G06F 3/0482 715/810 |
| 2012/0114154 | A1* | 5/2012 | Abrahamsson | H04R 5/033 381/309 |
| 2012/0129543 | A1* | 5/2012 | Patel | H04W 4/023 455/456.1 |
| 2012/0287827 | A1* | 11/2012 | Denne | H04L 12/1818 370/261 |
| 2013/0028144 | A1* | 1/2013 | Goodman | H04L 12/66 370/352 |
| 2013/0183901 | A1* | 7/2013 | Joergensen | H04M 1/57 455/41.2 |
| 2013/0316679 | A1* | 11/2013 | Miller | H04R 1/08 455/569.1 |
| 2014/0230632 | A1* | 8/2014 | Igoe | H04N 21/43637 84/625 |
| 2014/0298309 | A1* | 10/2014 | Proschowsky | G06F 8/654 717/170 |

(56) References Cited

U.S. PATENT DOCUMENTS

| | | | |
|---|---|---|---|
| 2014/0335908 A1* | 11/2014 | Krisch | H04W 4/08 455/518 |
| 2015/0032797 A1* | 1/2015 | Pan | H04L 67/01 709/203 |
| 2015/0043568 A1* | 2/2015 | Coulon | H04R 1/10 370/350 |
| 2015/0072666 A1* | 3/2015 | Lai | H04M 1/6066 455/416 |
| 2015/0110263 A1* | 4/2015 | Johnston | H04R 1/1041 381/74 |
| 2015/0181338 A1* | 6/2015 | Hosoi | H04R 1/02 381/309 |
| 2015/0208157 A1* | 7/2015 | Lu | H04R 1/1041 381/74 |
| 2015/0231017 A1* | 8/2015 | Kazemi Banyhashemi | A61H 1/0222 602/36 |
| 2015/0301788 A1* | 10/2015 | Johnston | H04N 21/4112 700/94 |
| 2016/0019902 A1* | 1/2016 | Lamblin | G10L 19/167 704/500 |
| 2016/0021229 A1* | 1/2016 | Lewis | H04M 1/72412 455/420 |
| 2016/0036962 A1* | 2/2016 | Rand | H04M 1/656 455/418 |
| 2016/0050321 A1* | 2/2016 | Tassone | H04L 9/40 370/261 |
| 2016/0050547 A1* | 2/2016 | Wong | H04M 1/6058 455/518 |
| 2016/0065707 A1* | 3/2016 | Yang | H04M 3/4285 455/569.1 |
| 2016/0119708 A1* | 4/2016 | Rodzevski | H04M 1/6066 381/74 |
| 2016/0191093 A1* | 6/2016 | Larsen | H04M 1/6066 455/41.2 |
| 2016/0227025 A1* | 8/2016 | Soby | H04M 19/042 |
| 2016/0295539 A1* | 10/2016 | Atti | H04L 43/087 |
| 2016/0337744 A1* | 11/2016 | Kim | H04R 3/04 |
| 2017/0208393 A1* | 7/2017 | Boesen | H04R 1/1058 |
| 2017/0332128 A1* | 11/2017 | Jeong | H04M 1/72415 |
| 2017/0353600 A1* | 12/2017 | Haikin | H04M 1/68 |
| 2018/0091887 A1* | 3/2018 | Minoo | H04R 1/1025 |
| 2018/0206038 A1* | 7/2018 | Tengelsen | H04R 3/005 |
| 2018/0227975 A1* | 8/2018 | Kihlberg | H04W 76/14 |
| 2018/0324486 A1* | 11/2018 | Lee | H04N 21/43076 |
| 2018/0356881 A1* | 12/2018 | Belverato | H04M 1/72412 |
| 2019/0028580 A1* | 1/2019 | Hosoi | H04M 1/0264 |
| 2019/0182878 A1* | 6/2019 | Huang | H04W 56/001 |
| 2019/0244632 A1* | 8/2019 | Rajasekaran | G10L 15/02 |
| 2019/0369641 A1* | 12/2019 | Gillett | G05D 1/0212 |
| 2020/0106468 A1* | 4/2020 | Sahoo | H01Q 1/245 |
| 2020/0150919 A1* | 5/2020 | Rand | H04R 1/406 |
| 2020/0193677 A1* | 6/2020 | Vaganov | A63F 13/65 |
| 2020/0222236 A1* | 7/2020 | Urich | A61M 1/84 |
| 2020/0236454 A1* | 7/2020 | He | H03M 1/12 |
| 2020/0275250 A1* | 8/2020 | Choi | H04W 12/0431 |
| 2020/0310780 A1* | 10/2020 | Chen | G06F 9/4411 |
| 2020/0344545 A1* | 10/2020 | Hvidsten | G06F 3/165 |
| 2021/0100048 A1* | 4/2021 | Snagg | H04W 76/40 |
| 2021/0127352 A1* | 4/2021 | Agrawal | H04R 1/1041 |
| 2021/0250641 A1* | 8/2021 | Aguiar | H04N 21/4223 |
| 2021/0258427 A1* | 8/2021 | Lee | H04L 12/1831 |
| 2021/0274319 A1* | 9/2021 | Basha | H04W 4/06 |
| 2021/0281963 A1* | 9/2021 | Xu | H04M 19/04 |
| 2021/0329370 A1* | 10/2021 | Kim | H04R 1/2807 |
| 2021/0329424 A1* | 10/2021 | Barzuza | H04W 12/33 |
| 2021/0377648 A1* | 12/2021 | Tome | H04R 1/1016 |
| 2021/0400142 A1* | 12/2021 | Jorasch | H04N 7/147 |
| 2021/0409856 A1* | 12/2021 | Zhu | H04R 5/033 |
| 2021/0409861 A1* | 12/2021 | Jorgovanovic | H04W 84/18 |
| 2022/0039041 A1* | 2/2022 | Zhu | H04L 12/40058 |
| 2022/0052863 A1* | 2/2022 | Harrington | H03G 3/3005 |
| 2022/0078541 A1* | 3/2022 | Zhu | H04W 4/38 |
| 2022/0240018 A1* | 7/2022 | Hsieh | H04R 5/033 |
| 2022/0248333 A1* | 8/2022 | Soulier | H04W 52/0254 |
| 2022/0321368 A1* | 10/2022 | Lee | H04L 65/611 |
| 2022/0369394 A1* | 11/2022 | Ni | H04W 76/14 |
| 2023/0020019 A1* | 1/2023 | Bhowmik | H04R 25/554 |
| 2023/0024547 A1* | 1/2023 | Ko | H04M 1/6066 |
| 2023/0114196 A1* | 4/2023 | Reibner | A61F 11/12 455/518 |
| 2024/0089411 A1* | 3/2024 | Goetzinger | H04N 7/142 |
| 2024/0281385 A1* | 8/2024 | Hamlin | G06F 13/10 |
| 2024/0283887 A1* | 8/2024 | Agarwal | G10L 15/08 |
| 2024/0290020 A1* | 8/2024 | Grossinger | G10L 21/10 |

\* cited by examiner

SYSTEM AND METHOD FOR SIMULTANEOUS MULTI-CALL SUPPORT CAPABILITY ON COMPATIBLE AUDIO DEVICES

CROSS-REFERENCE TO RELATED APPLICATION AND PRIORITY CLAIM

This application claims priority under 35 U.S.C. § 119(e) to U.S. Provisional Patent Application No. 63/146,860 filed on Feb. 8, 2021, which is hereby incorporated by reference in its entirety.

TECHNICAL FIELD

This disclosure relates generally to communication devices. More specifically, this disclosure relates to a system and method for simultaneous multi-call support capability on a hearing device.

BACKGROUND

Mobile electronic devices, such as smartphones and tablet computers, have become the most prevalent device type for communicating in professional and private settings. The mobile electronic device can connect to peripheral accessories to enhance user convenience.

In enterprise devices, such as mobile phones, tablets, and smartwatches, user communications are enabled by licensing or subscription costs for Voice-over-IP (VoIP) or Push-to-Talk (PTT) based solutions. These types of communications require unique hardware, specific RF communications protocols, heavy setup and management costs. These devices are use-case specific, custom-built, bulky and impair worker mobility in many scenarios. To overcome mobility issues, peripheral accessories (e.g., headsets, earbuds) can handle active calls or other communications within short-to-medium range distances. Currently, headsets or earbuds can handle only one active call in both their Left (L) and Right (R) speakers. For example, TV broadcaster crews and other on-field referees are sometimes required to carry multiple headsets to communicate with two different groups of technical or professional staff. Handling multiple headsets is not only cumbersome but also limits movement especially in high-mobility situations.

SUMMARY

This disclosure relates to a system and method for multi-call communications.

In a first embodiment, an electronic device includes a communication circuit configured to communicate with one or more second control devices and a hearing device (HD). The electronic device also includes a processor is configured to detect a number of group calls occurring on the one or more second control devices. The processor is also configured to: determine whether one or more channels of the HD are available; select a first group call; in response to determining that at least one channel is available, assign the first group call to a first channel of the HD; and stream voice and data corresponding to the first group call to the HD through the first channel.

In a second embodiment, a method includes communicating with one or more second control devices and a hearing device (HD). The method also includes detecting a number of group calls occurring on the one or more second control devices. The method also includes determining whether one or more channels of the HD are available. The method also includes selecting a first group call; and in response to determining that at least one channel is available, assigning the first group call to a first channel of the HD. The method further includes streaming voice and data corresponding to the first group call to the HD through the first channel.

In a third embodiment, a method for a multi-call system is provided. The method includes connecting a first control device (CD) coupled with a first hearing device (HD) to a plurality of call groups, each call group comprising a second CD and a plurality of HDs. The method also includes directing a call channel stream to the first HD coupled to the first CD, the call channel stream selected from the plurality of call groups.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc, a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
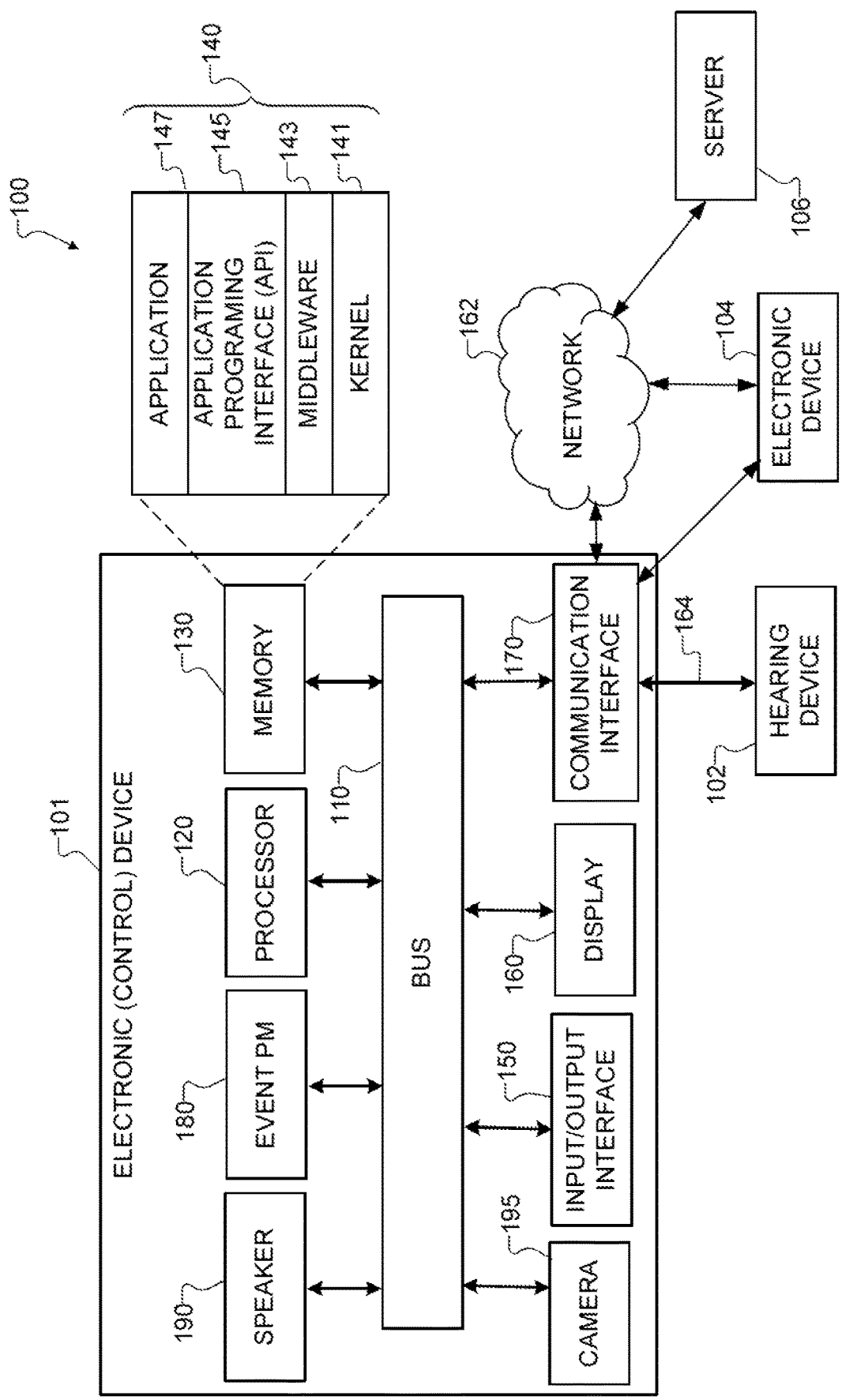
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, mobile electronic devices, such as smartphones, tablet computers, and smart watches, user communications are enabled by licensing or subscription costs for VoIP or PTT based solutions. The communications may require unique hardware, specific RF communications protocols, heavy setup, and management costs. These devices are use-case specific, custom-built, bulky and impair worker mobility in many scenarios. To overcome mobility issues, accessories (e.g., headsets, earbuds) need an enterprise device (also called as control device) to control or handle active calls/communications within short-to-medium range distances.

Current systems require users to join multiple group calls simultaneously to coordinate and/or execute some action Currently, this is accomplished either by joining a very big group and initiate call (or) switch between different group calls (or) wear multiple headsets/phones/other audio devices to the user. Handling multiple headsets or audio devices is not only cumbersome but limits movement especially in high-mobility situations. As an additional example, frontline workers or employees are usually unaware of the group calls currently in their immediate vicinity unless they are specifically invited to the meeting or group call. Finally, in order to attend a group call, the user needs to be included as a member of the group, such as by a meeting invite or request, and thereby display the identity of the user (such as email address, phone number or any other identity to invite them to the meeting) to wider audience.

Embodiments of the present disclosure provide a lightweight, out-of-box communication solution that enables individuals in high mobility situations to quickly connect to multiple group calls simultaneously within a specified range to interact on as many available communication channels using a single ear-worn communication device that includes microphone and speaker. Embodiments of the present disclosure provide a system and method that supports connection of one ear-worn communication device to multiple active calls simultaneously via suitable user interface. Embodiments of the present disclosure provide a system and method that supports display of calls occurring in an immediate vicinity of a communication device and provide a mechanism to join and exit the calls via a user interface. Certain embodiments provide a system and method that can demultiplex communication streams coming from nearby external group calls into multiple audio channels available in the ear-worn device where the number of streams is defined by a maximum of a capability of the ear worn device. That is, the number of streams can be as many streams as the ear worn device can accommodate or fewer. Certain embodiments provide a system and method that can multiplex communication streams coming from ear-worn device and duplicate the incoming stream into multiple streams based on a number of external group calls connected. Certain embodiments provide a system and method that supports geolocation-based contextual filtering of group calls happening in the vicinity of the communication device based on user permissions or administrator settings criteria. Certain embodiments provide a system and method that supports connection or pairing of audio communication streams in hearing devices based on gestures and without a need for direct interaction with a control device.

In the present disclosure, a control device (CD) is a device with high processing or computation power and energy, such as smartphones, tablets, watches, and other internet of things (IoT) devices, such as plugged-in voice assistants/speakers/microphones. A hearing device (HD) is a device with less processing or computation power, such as headphones, earphones, ear buds, and other IOT devices, such as battery powered voice assistants and speakers with microphones.

According to certain embodiments, a plurality of HDs can connect to a CD and a plurality of CDs can connect with each other depending upon a physical capability of an underlying communication hardware. For example, a multi-BLUETOOTH connection can support more than one BLUETOOTH connection by a same device; a WI-FI DIRECT can support multiple connections from a single WI-FI source device; and a cellular connection can have a certain number of connections in a group call.

The number of audio/communication channels existing between CD and HD device depends on a capability of underlying hardware devices. For example, earphones and earbuds usually have a minimum of two channels for communication: one channel for a left (L) ear and another channel for a right (R) ear. Embodiments of the present disclosure use the available channels in certain manner and, as such, varying degrees of channels and capabilities of the hearing devices can be utilized without departing from the scope of the present disclosure. Embodiments of the system ore configured to adjust to as the number of channels available for usage.

FIG. 1 illustrates an example network configuration 100 in accordance with this disclosure. The embodiment of the network configuration 100 shown in FIG. 1 is for illustration only. Other embodiments could be used without departing from the scope of this disclosure. As shown in FIG. 1, according to embodiments of this disclosure, an electronic device (also referenced herein as "control device") 101 is included in the network configuration 100. The electronic device 101 may include at least one of a bus 110, a processor 120, a memory 130, an input/output (I/O) interface 150, a display 160, a communication interface 170, or an event processing module 180. The electronic device 101 may also include a speaker 190 and camera 195. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 133 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device. Additionally, the communication interface 170 can establish a communication with the external electronic device 102 using a near field communication (NFC) or short-range communication protocol such as BLUETOOTH, WI-FI DIRECT, ZIGBEE or an ultra-wideband wireless technology.

The first external electronic device (also referenced herein as a "hearing device") 102 or the second external electronic device 104 may be a wearable device or an electronic device 101-mountable wearable device (such as a head mounted display (HMD)). In certain embodiments, the first external electronic device 102 includes the same or similar components as the electronic device 101. In certain embodiments, the second external electronic device 104 includes the same or similar components as the electronic device 101. When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high-definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The camera 195 can be configured to capture still or moving images. For example, the camera 195 can capture a single frame or multiple frames. In certain embodiments, the camera 195 is a single camera. In certain embodiments, the camera 195 is an imaging system that includes multiple cameras. In certain embodiments, the camera 195 comprises a camera disposed beneath the display 160, namely an under-display camera (UDC).

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, a I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

In some embodiments, the processor 120 or event processing module 180 is configured to communicate with the server 106 to download or stream multimedia content, such as images, video, or sound. For example, a user operating the electronic device 101 can open an application or website to stream multimedia content. The processor 120 (or event processing module 180) can process and present information, via the display 160, to enable a user to search for content, select content, and view content. In response to the selections by the user, the server 106 can provide the content or record the search, selection, and viewing of the content, or both provide and record.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
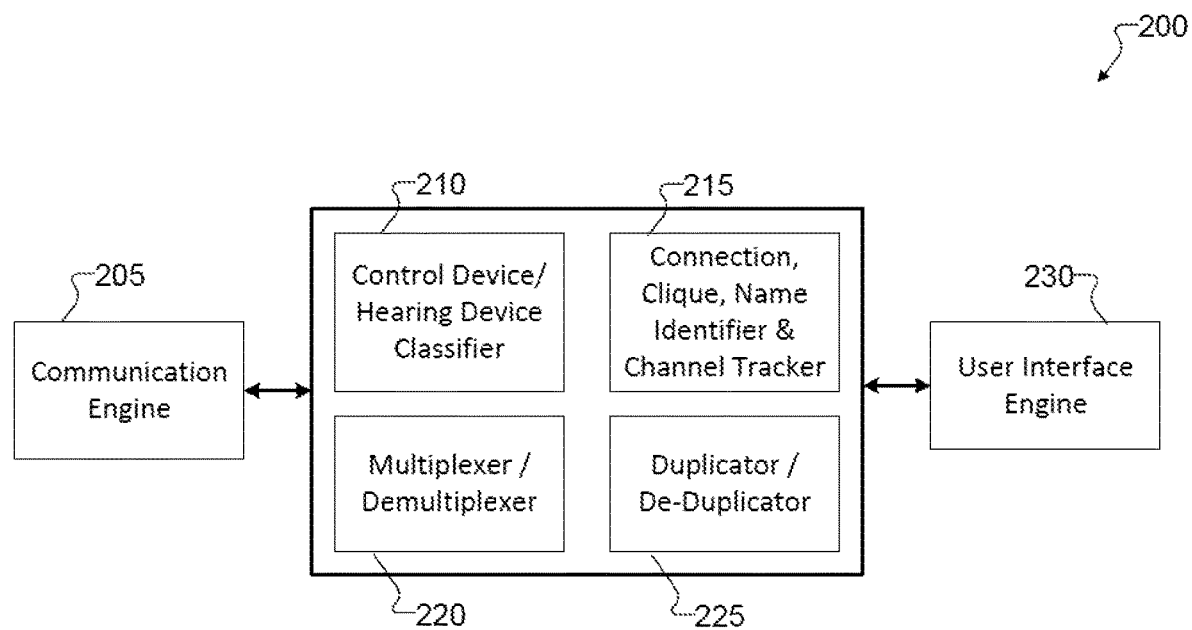
FIG. 2 illustrates an example processing control engine in accordance with this disclosure.

FIG. 2 illustrates an example processing control engine in accordance with this disclosure. The embodiment of the processing control engine 200 shown in FIG. 2 is for illustration only. Other embodiments could be used without departing from the scope of the present disclosure. For ease of explanation, the processing control engine 200 may be described as being a processor, multiple processors, included in processor 120, or used by the electronic device 101 or electronic device 102 in the network configuration 100 of FIG. 1. However, the processing control engine 200 may be included in or used by any other suitable device and in any other suitable system, such as a system that includes a processing and communications system.

The processing control engine 200 is configured to communicate with a communication engine 205 of a device, such as electronic (control) device 101 or electronic (hearing) device 102. The communication engine 205 can be implemented by or included in the communication interface 170. The communication engine 205 can be a communication circuit configured to enable a communication via one or more of: BLUETOOTH, WI-FI DIRECT, ZIGBEE or an ultra-wideband wireless technology. The communication engine 205 can be a module that interfaces with the internal hardware and software stacks in any mobile operating system (OS) architecture to enable data and other associated signaling communications between plurality of devices. The communication engine 205 interacts with the processing control engine 200 via regular OS communication links or interfaces.

The processing control engine 200 includes a control and hearing device classifier 210, a connection, name and channel (CNC) tracker 215, a multiplexer-demultiplexer (MUX/DEMUX) 220, and a duplication and de-duplication circuit 225. The processing control engine 200 also communicates with a user interface (UI) engine 230. The processing control engine 200 coordinates and interacts with multiple other modules to achieve overall SAR system and methodology. The processing control engine 200 can be implemented in a single hardware processor or one or more hardware processors in a multi-processor system. The processing control engine 200 coordinates & interacts with multiple other modules to achieve overall multi-call system and its functioning in all CD devices; the HD devices do not run the multi-call functionality.

The control and hearing device classifier 210 is configured to identify a device category type. The control and hearing device classifier 210 determines whether the device is a control device, such as a phone or tablet, or a hearing device, such as an earbud or headset.

The CNC tracker 215 identifies the number of other CD connections available, a name of clique assigned in the CD, and the number of channels available with the HD connected to the CD in which the multi-call solution runs. Based on the number of control devices available, CNC tracker 215 determines the number of connections. The CNC tracker 215 also determines the corresponding names of the cliques and their respective group calls. The names of the cliques and group calls enables a user to identify and connect to multiple different calls. The names further enable an HD to connect to a call without a need for a CD.

The MUX/DEMUX 220 controls the multiplexing and demultiplexing of data streams passing through the CD device. The MUX/DEMUX 220 is configured to multiplex communication streams coming from an HD and duplicate the HD communication stream into multiple streams, based on number of external group calls connected. The MUX/DEMUX 220 also can demultiplex communication streams coming from nearby external group calls into a number of audio channels. For example, the MUX/DEMUX 220 can demultiplex the streams up to a maximum number of audio channels available in the HD. That is, if the HD supports five channels (as in a 5.1 system), the MUX/DEMUX 220 can demultiplex the streams into one, two, three, four, or five channels. Therefore, if calls from two different groups need to be channeled to one HD, such as via the left ear and right ear, the MUX/DEMUX 220 determines how to manage the streams.

The duplication and de-duplication circuit 225 is configured to deduplicate duplicate data streams that are currently passing data to the HD. The duplication and de-duplication circuit 225 also is configured to duplicate data streams that are currently passing data from an HD to other CD cliques. Based on interactions, the HD may receive duplicate streams that need to be de-duplicated to enable the user to properly hear the call. Additionally, as the user is responding to two different calls, the response may need to be duplicated to be able to be sent along both channels. Therefore, one microphone can be used to provide data for two streams for two calls.

The UI engine 230 is configured to provide an operator of the electronic device with an indication regarding the multi-call connectivity. The UI engine 230 can provide a visual, audible, or tactile indication to the operator regarding an opportunity for the user to select and assign plurality of connection streams with the plurality of available audio channels as determined by the control engine characteristics. For example, the UI engine 230 can provide an indication to nudge the operator with UI screen to move select a channel for a respective stream. The UI input can be any suitable input, such as a button, a touch pad, a touch screen, a contact point, a voice input, and the like.

Figure 3:
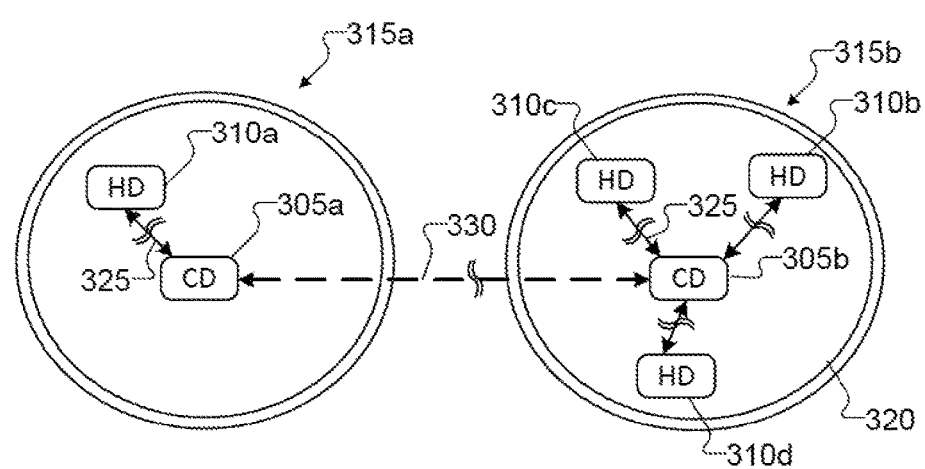
FIG. 3 illustrates an example of ad-hoc group communication in accordance with this disclosure.

FIG. 3 illustrates an example of ad-hoc group communication in accordance with this disclosure. The embodiments of the ad-hoc group communication 300 shown in FIG. 3 is for illustration only. Other embodiments could be used without departing from the scope of the present disclosure.

In the example shown in FIG. 3, the ad-hoc group communications occur between and among one or more control devices (CD) 305 and one or more hearing devices (HD) 310. A CD 305 is any device having high processing/computation power and energy. Examples of CDs 305 include smartphones, tablets, watches and other IOT devices, such as plugged-in voice assistants/speakers/microphones. A HD 310 is any device having less processing/computation power. Examples of HDs 310 include headphones, earphones, ear buds and other IOT devices such as battery powered voice assistants/speakers/microphones.

A number of HDs 310 that can connect to a CD 305 and a number of CDs 305 that can connect with each other depends on physical capability of underlying communication hardware, such as whether the connection is a multi-BLUETOOTH connection that supports more than one BLUETOOTH connection by the same device, or a WI-FI DIRECT supports that multiple connections from a single WI-FI source device. Embodiments of the present disclosure are configured for operation with various electronic device irrespective of the hardware configurations for the communication protocols and no inference is presented to increase or decrease the general technical specification provided by the RF communication protocol and as such is not a liability or limitation for the scope of this disclosure.

In the example shown in FIG. 3, an ad-hoc group communication 300 is shown in which bi-directional communications occur between a first CD 305a and a second CD 305b. Each of the CDs 305 is disposed within a respective clique 315. A clique 315 is a group of participating compatible devices having a minimum of one CD 305 and one or more HDs. An HD 310 that is connected directly to a CD 305 is also called a Leaf HD. Each clique 315 can have an identifier or name associated for each of them. The name or identifier of the clique 315 can be a random string generated by the CD 305 or user-assigned name input by the user via a UI 230 of a CD 305.

A CD 305 is able to communicate with one or more HDs 310 within a certain visibility range, as defined by the respective technologies and capabilities. The signal visibility range of HDs which are connected to the CD 305 inside a clique is called the clique communication range (CCR). For example, CD 305b is configured to communicate with HDs 310b-d within a CCR 320. Though CD 305b can have a higher power and range to connect to other CDs 305 further away using other compatible short-to-medium range RF communication protocol, the CCR 320 is primarily limited to BLUETOOTH connectivity range since HDs 310 are predominately BLUETOOTH enabled.

Each CD 305 can have a respective intra-clique connectivity 325 between one or more HDs 310. The intra-clique connectivity 325 provides a two-way communication within clique 315 between CD 305 and one or more HDs 315. For example, CD 305b has intra-clique connections 325 with HDs 310b-d and CD 305a has an intra-clique connection 325 with HD 310a. The intra-clique connectivity 325 includes voice data and other signaling/sync protocol data. Additionally, each CD 305 can have an inter-clique connectivity 330 with another CD 305 in a different clique. For example, CD 305a in the first clique 315a has an inter-clique connection 330 with CD 305b in the second clique 315b. The inter-clique connectivity 330 includes voice data and other signaling/sync protocol data. Inter-clique communications 330 can only occur between CDs belonging to different cliques. Inter-clique communications 330 provide data communication for the multi-call support feature. The number of simultaneous inter-clique connections depends on the number of channels in a target CD 305.

In certain embodiments, the number of HDs 310 connectable to a CD 305 is capped at a specified number to maintain call quality. In certain embodiments, the number of one or more CDs 305 connected to the plurality of HDs 310 is optimized (increased or decreased) depending on a call quality metric, power availability of control device and the number of connected 310.

Figure 4:
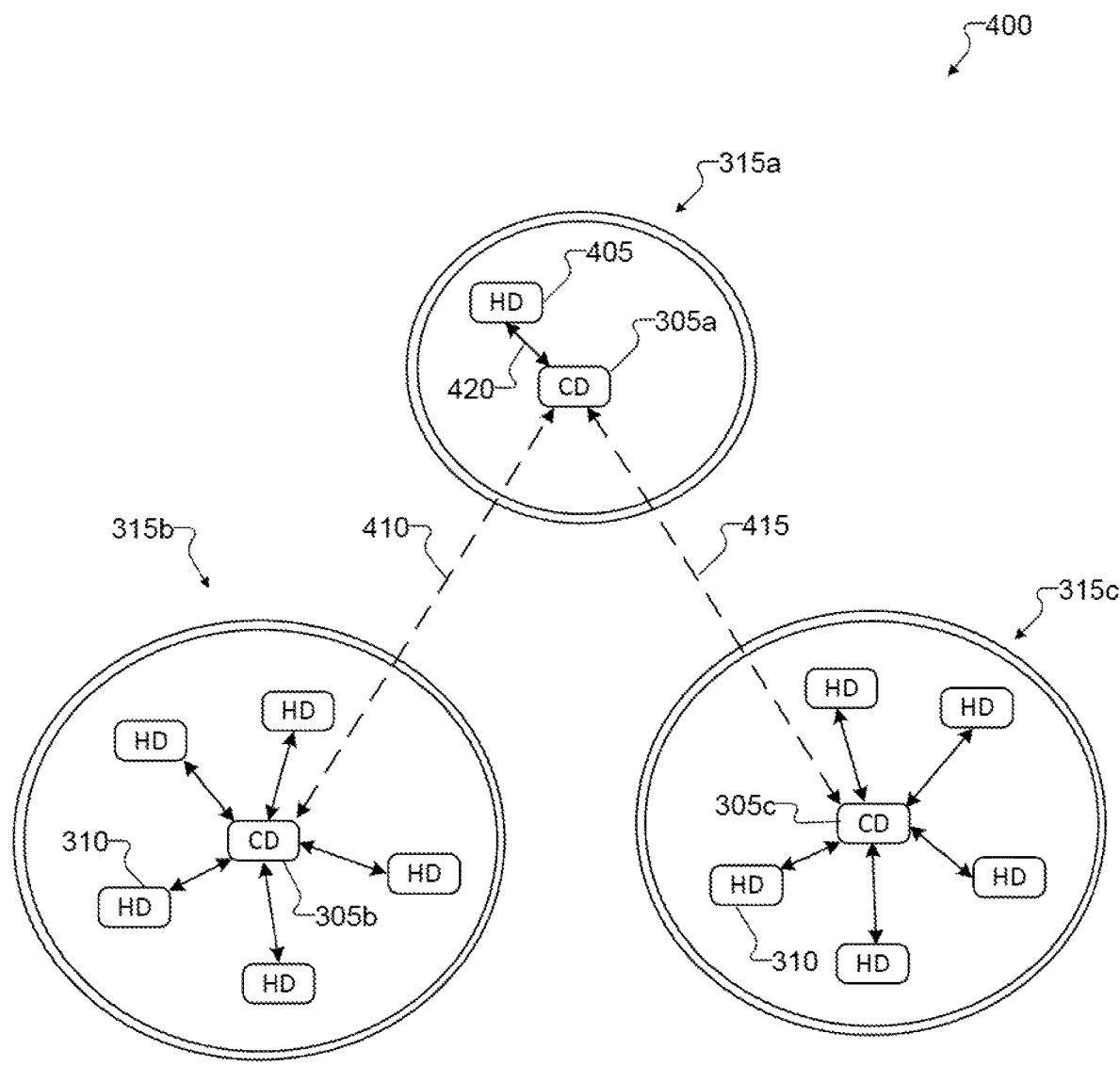
FIG. 4 illustrates an example of multi-call communication in accordance with this disclosure.

FIG. 4 illustrates an example of multi-call communication in accordance with this disclosure. The embodiments of the multi-call communication 400 shown in FIG. 4 is for illustration only. Other embodiments could be used without departing from the scope of the present disclosure.

In certain embodiments, a mesh network consisting of multiple cliques 315 is configured to conduct a multi-call communication 400. Each clique 315 includes a group of participating compatible devices having a minimum of one CD 305 and one or more HDs 310. Each clique can have an identifier or name associated for each clique 315. The name or identifier can be a random string generated or a user-assigned name. Any group of participating compatible devices having a minimum of one CD 305 and one HD 310 is called a target clique 315.

The CD 305a in the target clique 315a is the only CD 305 that can establish a multi-call connect feature since the CD 305a has only one HD 310a connected thereto and CD 305a is connected to CDs 305b in clique 315b and 305c in clique 315c. The CDs 305b and 305c in the other cliques 315b, 315c connected to a target clique 305a cannot establish a multi-call since these CDs 305 are connected to more than one HD 310. That is, CDs 305b is connected to five HDs 310a and 305c is also connected to five HDs 310.

In certain embodiments, two or more group calls are occurring concurrently. A user with HD 405 in target clique 315a may need to engage with both calls. In the example shown in FIG. 4, a first group call, via inter-clique communication 410, is occurring between clique 315a and clique 315b and a second group call, via inter-clique communication 415 is occurring between clique 315a and clique 315c. Inter-clique communications 410, 415 provide data communication for the multi-call support feature. Clique 315b and clique 315c are two groups with multiple CD 305 and HD 310 devices with the multi-call protocol running in all devices. The number of simultaneous clique connections depends on the number of channels in target CD 305a. The CD 305a includes multiple channels for communication, via intra-clique communication 420, with HD 405. The intra-clique communication 420 provides a two-way communication within clique 315a between CD 305a and HD 405. Although some systems may include one channel (monophonic audio), many CDs and HDs include two channels, one for a right ear and one for the left ear; three channels, such as 2.1; six channels, such as in 5.1 surround sound having five standard and one low frequency; seven channels, such as in 6.1 surround sound; and eight channels, such as 7.1 surround sound. Systems having more channels could be used without departing from the scope of the present disclosure.

In certain embodiments, the HD 405 is configured to provide an indicator to inform the user that the two calls are occurring. The indicator can be a visual, audible, or tactile indication to the user informing the user that the calls are occurring. In response, the user can provide an input to the UI to engage with the two calls. For example, the user can select an option on a touch screen; can tap one or both of the ear buds; can shake the HD with a specified gesture; or provide a preset verbal command. The method and format of the user input can be determined by the technology of the CD or HD, and options for other forms of input could be used without departing from the scope of the present disclosure. The indicator can be an icon that provides the user with an indication regarding the opportunity for the user to select and assign plurality of connection streams with the plurality of available audio channels as determined by the control engine characteristics.

In certain embodiments, the UI is configured to receive an input for assignment of calls to respective channels. For example, the UI can provide an interface in which the user can assign the first group call, via inter-clique communication 410, to a first channel corresponding to a left ear and assign the second group call, via inter-clique communication 415, to a second channel corresponding to a right ear. The UI also provides an end-call option in which the user can terminate one call or both calls. In certain embodiments, the call termination features enable the user to select specific calls to terminate individually or simultaneously.

Target clique 315a is created by a signal awareness and reliability (SAR) protocol to enable multiplexing calls from multiple different cliques, such as cliques 315b, 315c. In one example, the target clique 315a data streams to left channel and clique 315b streams into right channel in case of two channels. In certain embodiments, in the overall scheme of SAR mesh protocol datasets, each CD will register information such as:

Name or string identifier of primary CD node;
Number of inter-clique connections for primary CD node;
Number of inter-clique connections for their node; and
Number of intra-clique connections for their node.

Figure 5:
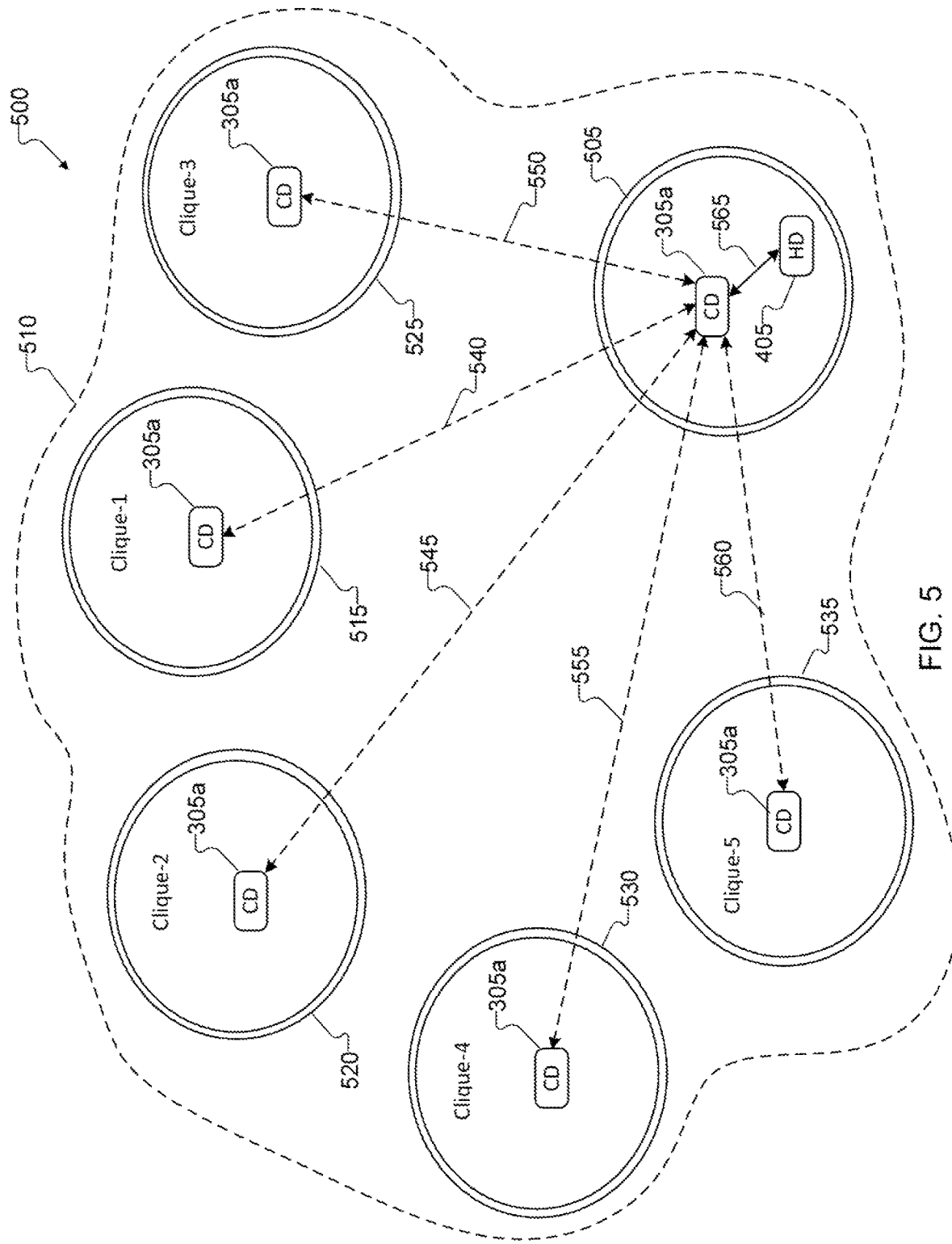
FIG. 5 illustrates an example of a multi-call mesh network in accordance with this disclosure.

FIG. 5 illustrates an example of a multi-call mesh network in accordance with this disclosure. The embodiments of the multi-call mesh network 500 shown in FIG. 5 is for illustration only. Other embodiments could be used without departing from the scope of the present disclosure.

In the example shown in FIG. 5, the multi-call mesh network 500 includes a target clique 505 and multiple other cliques. The network is referenced as a multi-call mesh network 500 because all the cliques are included in the same CD Communication Range (CDCR) 510 of the target CD 305a. For example, the CDCR 510 of target CD 305a of the target clique 505 includes clique 1 515, clique-2 520, clique-3 525, clique-4 530, and clique-5 535. Each of clique 1 515, clique-2 520, clique-3 525, clique-4 530, and clique-5 535 includes one of more HDs. As stated previously, a CD by virtue of better power and better connectivity hardware/RF radios, has much better range than the HDs within that clique. Also, the CDCR 510 is not only limited to BLUETOOTH but may be connected via WI-FI or UWB signal ranges. This CDCR determines the ability of a CD 305 in particular clique to be a "primary node" or "secondary node".

In one example depicted, the target CD 305a is capable of communicating via at least five channels. For example, the target CD 305a can be configured with a 5.1, 6.1, or 7.1 system. The target CD 305a is able to detect a multi-call communication occurring. The target CD 305a is further able to establish or join calls with each of clique 1 615, clique-2 520, clique-3 525, clique-4 530, and clique-5 535. For example, target CD 305a can engage in first call 540 with clique 1 515, a second call 545 with clique-2 520, a third call 550 with clique-3 525, a fourth call 555 with clique-4 530, and a fifth call 560 with clique-5 535.

The target CD 305a can provide the user with a UI, such as via display 160, indicating that the calls are occurring. The UI also can provide a user with an option to assign individual calls to respective channels to HD 405. In certain embodiments, when HD 405 is capable of handling five channels, the user can assign each of the calls to a respective channel of the intra-clique communication 565. In certain embodiments, when HD 405 is not able to handle five channels, such as only being able to handle two channels, the UI can provide the user the option to select two of the five calls for the user to listen to and talk. In certain embodiments, the UI can provide the user the option to dynamically switch between the five calls during the conversations.

Figure 6:
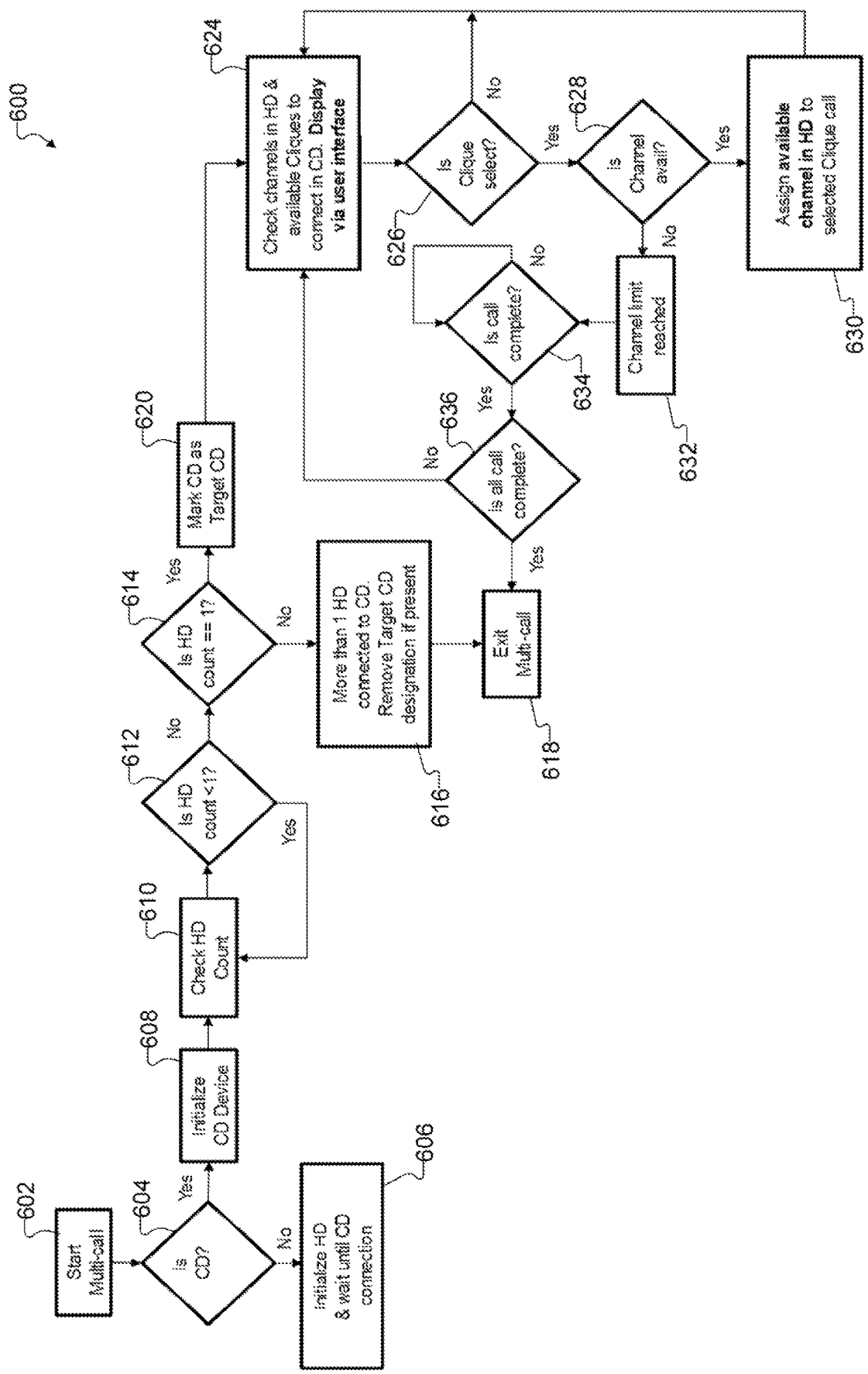
FIG. 6 illustrates a process for a multi-call operation in accordance with this disclosure.

FIG. 6 illustrates a process for a multi-call operation in accordance with this disclosure. While FIG. 6 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 600 depicted can be implemented by one or more processors in mobile electronic device, such as by one or more processors 120 of an electronic device 101.

In operation 602, a multi-call starts. If there is no CD present, in operation 604, an HD is initialized and the HD waits until a CD is connected in operation 606. If a CD is connected, the CD is initialized in operation 608. The CD checks an HD count to determine how many HDs are connected in operation 610. If the number of HDs connected is less than one (HD count<1), in operation 612, the CD rechecks the HD count in operation 610; otherwise, the process proceeds to operation 614 to determine whether the number of HDs connected is absolutely one (HD count=1). If the number of HDs is not one, such as being greater than one, the CD cannot be a target CD and the target CD designation (if present) is removed in operation 616 and the call is exited in operation 618. If only one HD is connected, that is HD count=1, the CD is designated as a target CD in operation 620. In operation 624, the target CD checks the channels in the HD and available cliques for connection to the target CD. Once the channels are checked, a UI is displayed to inform the user regarding the channels in the HD and available cliques. If the user selects an available clique, and corresponding clique call, the CD determines whether an HD channel is available in operation 628; otherwise the target CD again checks the channels and available cliques in operation 624. If an HD channel is available in operation 628, the available HD channel is assigned to the selected clique call in operation 630. The target CD then streams voice and data corresponding to the selected call to the HD through the assigned channel. If an HD channel is not available, the target CD determines whether an HD channel limit has been reached in operation 632. The target CD also determines whether the selected clique call is completed in operation 634. The target CDs continues to determine whether the selected clique call is completed in operation 634 until the selected clique call completes. If the target CD determines that the selected clique call is completed in operation 634, the target CD determines whether all the calls in the available cliques are complete in operation 636. If all the calls are not complete, the target CD again checks the channels in the HD and available cliques for connection to the target CD in operation 624. If all the calls are complete in operation 636, the multi-call is exited in operation 618.

Figure 7:
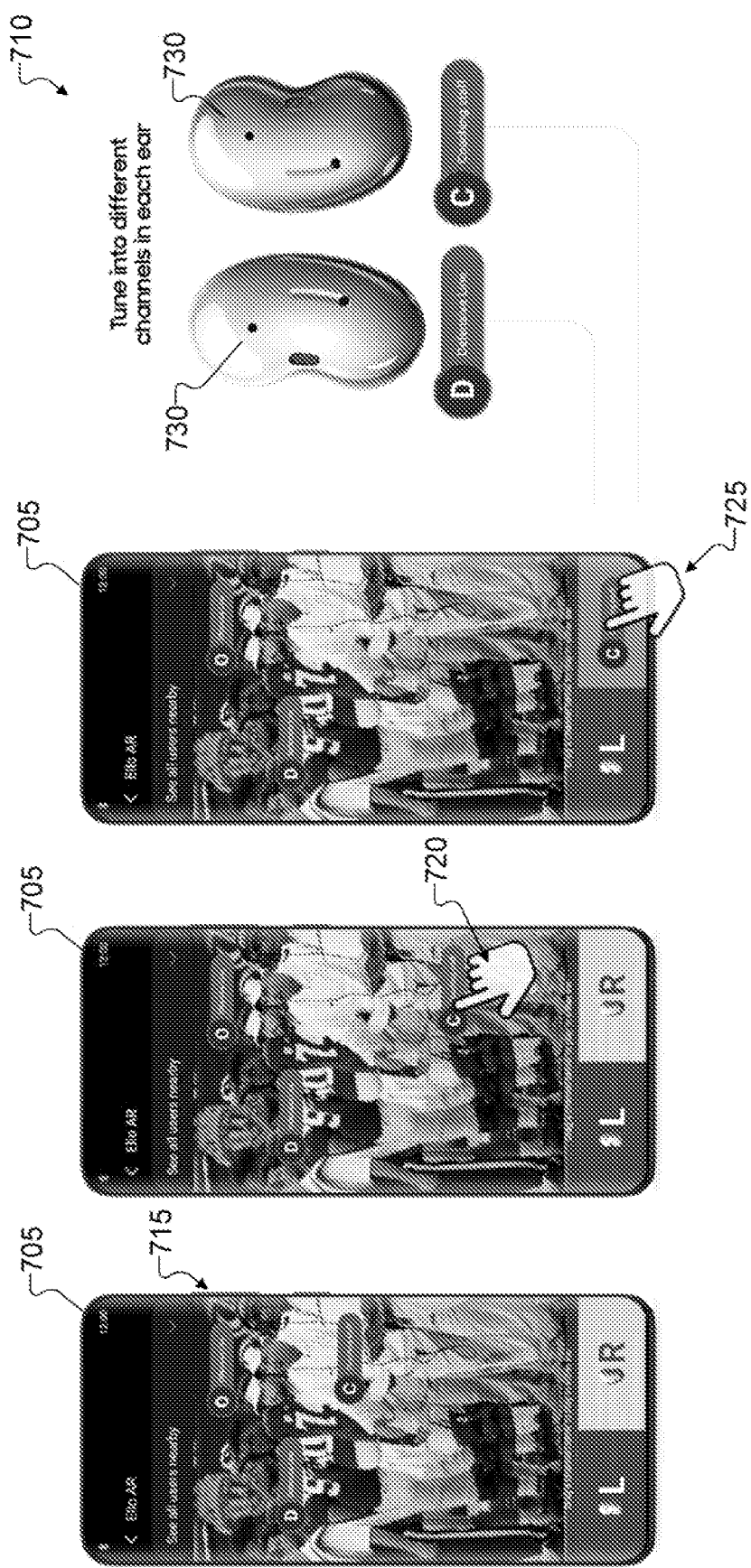
FIG. 7 illustrates example user interfaces and user interactions in accordance with this disclosure.

FIG. 7 illustrates example user interfaces and user interactions in accordance with this disclosure. The embodiments of the user interfaces and user interactions shown in FIG. 7 are for illustration only. Other embodiments could be used without departing from the scope of the present disclosure.

In certain embodiments, all HDs are connected to any CD device within the clique. When a multi-call system initially starts in CD, such as the first time, the multi-call protocol in the target CD is initialized, and the processing control engine 200 maintains a check of the number of HD devices connected to the CD. An HD cannot run a multi-call feature since HD may not have a UI. The HD also does not include the necessary hardware suitable to maintain connections with other CD devices.

As HDs keep connecting to a CD, the CD constantly updates an HD count and periodically checks whether the CD satisfies a criterion to become a Target CD. The criterion specifies that only one HD device can be connected to a target CD. Any CD can change from a target CD to regular CD based on the criterion and whether the CD is part of a target clique or regular clique.

In the example shown in FIG. 7, a target CD 705, such as a mobile phone, is coupled with HD 710 and configured to join a multi-call. The HD 710 and be a pair of ear buds. If target CD 705 is within a range of other clique calls occurring in a vicinity of target CD 705, target CD 705 can display an availability to join the other clique calls via a UI 715 of target CD 705. For example, target CD 705 can display a visual image of one or more of the ongoing clique calls. The user can select 720 one of the clique calls and assign 725 the selected clique call to a channel of the HD 710. When the user selects 720 a clique and assigns 725 a particular group call to a particular communication channel, the items are updated in the processing control engine 200 and UI. When a limit is reached, no further addition of group calls is possible. That is, if HD 705 can handle only two channels, once the user selects two group calls and assigns the selected group calls to respective channels of the HD 710, each channel of the HD 705 is occupied, and the HD 710 will have no available channels. Therefore, the user cannot add further group calls to HD 710. In certain embodiments, the user can dynamically switch groups by selecting an unselected group and assigning the previously unselected group to an assigned channel thereby unassigning a previously assigned group call and placing the newly selected group call on the channel. In certain embodiments, when connected multi-calls are disconnected, new calls can be added dynamically and at run-time.

In certain embodiments, all group calls that are a part of the multi-call are complete, the target CD 705 can either check for more calls or exit the multi-call process. In certain embodiments, once initiated at initial startup, the multi-call software in the target CD 705 runs continuously in the background and, as such, the exit condition does not stop the multi-call process.

In certain embodiments, HD 710 includes a user interface. The HD user interface may or may not include a display. For example, the HD 710 UI 730 can be a touch point, responsive to a user contact, disposed on a surface of the HD 710. Instead of using a UI 715 in target CD 705 to assign communication streams to available channels, the HD 710 can receive an input to select or assign the available communication streams to respective channels. For example, the UI 730 can be responsive to a user touch such that, when the user contacts the UI 730, the user can cycle through the group calls. In certain embodiments, the HD 710 can be responsive to a gesture, such as a shaking to select the available communication streams. For example, the HD 730 can be responsive to a user gesture such that, when the user gestures the HD 710, the user can cycle through the group calls. In certain embodiments, the user can select the group call via UI 715 of target CD and assign the selected call to a channel via UI 730 or the gesturing of the HD 710.

In the non-limiting example shown in FIG. 7, a right (R) portion of HD 710 (i.e., right earbud or earphone) is tapped a number of times (e.g., three times), the HD 710 communicates sync data to target CD 705. The target CD 705 generates voice stream of available group calls or a clique name to the HD 710. The voice stream is created from string-to-voice generator in target CD 705 using the clique identifier name or random string. The HD 710 can then read out or announce the information to the user. The user can then select, via a single tap, to receive the call or reject, via two taps, the multi-call pairing. If selected, the target CD 705 assigns this clique call to the right (R) portion of HD 710. Similarly, this can be repeated in a left (L) portion of HD 710 for the left channel or again on the right (R) portion of HD 710 for the right channel. The UI 710 or gesture can be set, adjusted, and decided at time of manufacturing based on hearing device aesthetics and functionality.

Figure 8:
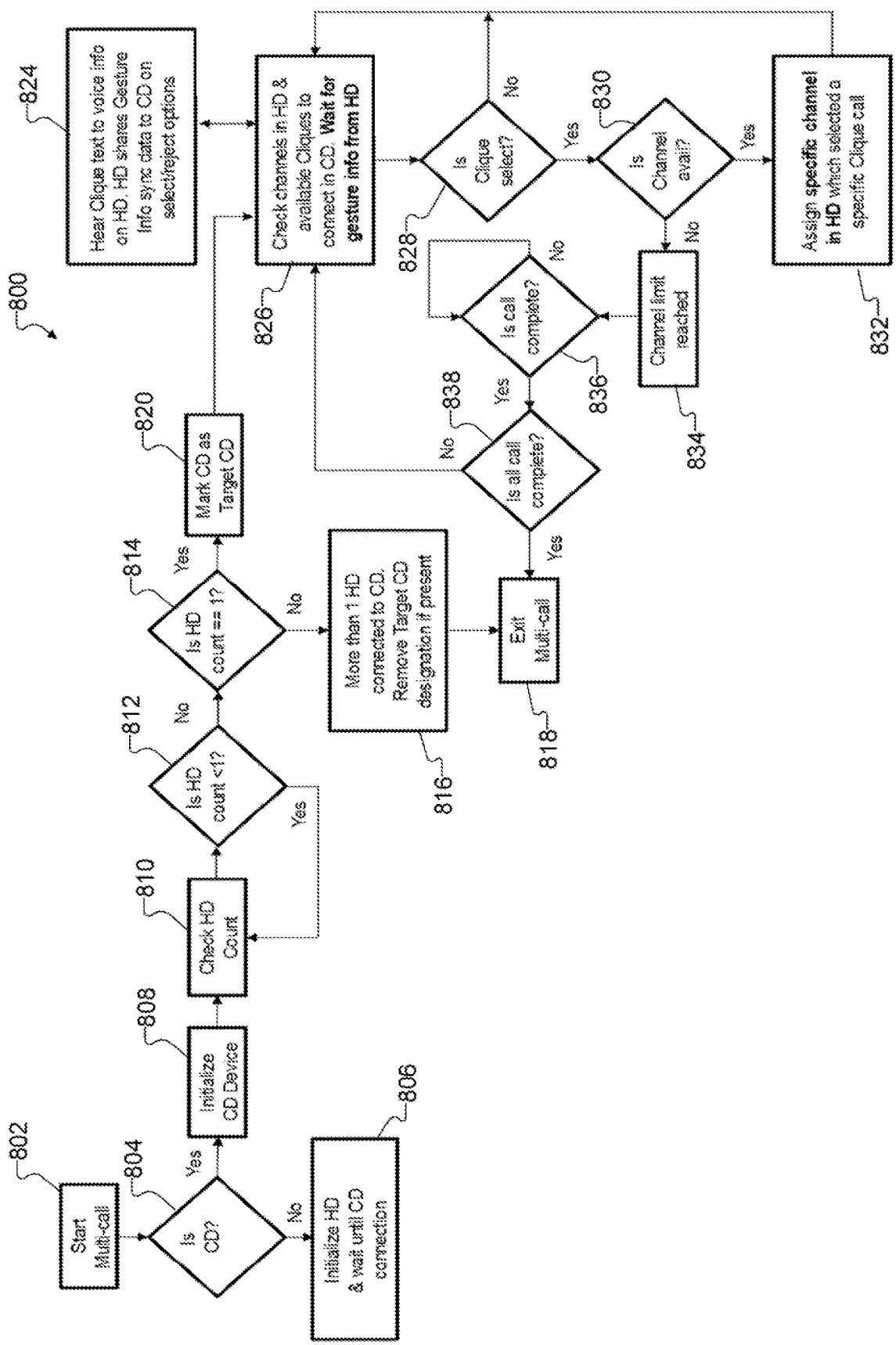
FIG. 8 illustrates another process for a multi-call operation in accordance with this disclosure.

FIG. 8 illustrates another process for a multi-call operation in accordance with this disclosure. While FIG. 8 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 700 depicted can be implemented by one or more processors in mobile electronic device, such as by one or more processors 120 of an electronic device 101.

In operation 802, a multi-call starts. If there is no CD present, in operation 804, an HD is initialized and the HD waits until a CD is connected in operation 806. If a CD is connected, the CD is initialized in operation 808. The CD checks an HD count to determine how many HDs are connected in operation 810. If the number of HDs connected is less than one (HD count<1), in operation 812, the CD rechecks the HD count in operation 810; otherwise, the process proceeds to operation 814 to determine whether the number of HDs connected is absolutely one (HD count=1). If the number of HDs is not one, such as being greater than one, the CD cannot be a target CD and the target CD designation (if present) is removed in operation 816 and the call is exited in operation 818. If only one HD is connected, that is HD count=1, the CD is designated as a target CD in operation 820. In operation 824, the target CD hears clique text to voice information on the connected HD. The HD shares gesture information synchronization data with the target CD regarding select or reject operations. For example, the HD can provide select and rejection gesture information for each ear bud of an HD. In operation 826, the target CD checks the channels in the HD and available cliques for connection to the target CD. Once the channels are checked, a UI is displayed to inform the user regarding the channels in the HD and available cliques. If the user selects an available clique in operation 828, and corresponding clique call, the CD determines whether an HD channel is available in operation 830; otherwise, the target CD again checks the channels and available cliques in operation 826. If an HD channel is available in operation 830, a specific or selected HD channel is assigned to the selected clique call in operation 832. If an HD channel is not available, the target CD determines whether an HD channel limit has been reached in operation 834. The target CD also determines whether the selected clique call is completed in operation 836. The target CDs continues to determine whether the selected clique call is completed in operation 836 until the selected clique call completes. If the target CD determines that the selected clique call is completed in operation 836, the target CD determines whether all the calls in the available cliques are complete in operation 838. If all the calls are not complete, the target CD again checks the channels in the HD and available cliques for connection to the target CD in operation 826. If all the calls are complete in operation 838, the multi-call is exited in operation 818.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Although this disclosure has been described with example embodiments, various changes and modifications may be suggested to one skilled in the art. It is intended that this disclosure encompass such changes and modifications as fall within the scope of the appended claims.

What is claimed is:

1. A first control device comprising:
at least one communication circuit configured to communicate with two or more second control devices and one or more hearing devices (HDs); and
at least one processor configured to:
  detect a multi-call comprising two or more group calls that correspond to the two or more second control devices;
  determine whether the first control device is communicatively coupled with no HD, one HD, or more than one HD;
  in response to determining that the first control device is communicatively coupled with a specified one HD, designate the first control device as a target control device that is allowed to simultaneously engage with the two or more group calls;
  in response to designating the first control device as the target control device, select a first group call from the two or more group calls;
  determine whether one or more channels of the specified HD are available, wherein an available channel of the specified HD is not occupied by a group call;
  in response to determining that at least a first channel of the specified HD is available, assign the first group call to the first channel; and
  stream voice and data corresponding to the first group call to the specified HD through the first channel.

2. The first control device of claim 1, wherein the at least one processor is further configured to:
select a second group call from the two or more group calls;
determine whether at least one channel of the specified HD is available;
in response to determining that at least a second channel of the specified HD is available, assign the second group call to the second channel; and
stream voice and data corresponding to the second group call to the specified HD through the second channel.

3. The first control device of claim 1, wherein the at least one processor is further configured to:
demultiplex a number of call streams from the two or more second control devices; and
multiplex a call stream from the specified HD and duplicate the call stream into multiple streams for transmission to respective ones of the two or more second control devices.

4. The first control device of claim 1, further comprising a display;
wherein the at least one processor is further configured to display, on the display, an identification of the two or more group calls and available channels of the specified HD for selection of one of the group calls as the first group call and assignment of the first group call to the first channel of the specified HD.

5. The first control device of claim 1, wherein the at least one processor is further configured to:
receive a selection signal from the specified HD, the selection signal configured to provide at least one of:
selection of the first group call from the two or more group calls; or
assignment of the first group call to the first channel of the specified HD.

6. The first control device of claim 5, wherein the at least one processor is further configured to:
translate call group names or identifiers corresponding to the two or more group calls from text to voice; and
transmit the translated call group names or identifiers to the specified HD.

7. The first control device of claim 5, wherein the selection signal is received in response to a user input received at the specified HD.

8. A method performed by a first control device, the method comprising:
communicating with two or more second control devices and one or more hearing devices (HDs);
detecting a multi-call comprising two or more group calls that correspond to the two or more second control devices;
determining whether the first control device is communicatively coupled with no HD, one HD, or more than one HD;
in response to determining that the first control device is communicatively coupled with a specified one HD, designating the first control device as a target control device that is allowed to simultaneously engage with the two or more group calls;
in response to designating the first control device as the target control device, selecting a first group call from the two or more group calls;
determining whether one or more channels of the specified HD are available, wherein an available channel of the specified HD is not occupied by a group call;
in response to determining that at least a first channel of the specified HD is available, assigning the first group call to the first channel; and
streaming voice and data corresponding to the first group call to the specified HD through the first channel.

9. The method of claim 8, further comprising:
selecting a second group call from the two or more group calls;
determining whether at least one channel of the specified HD is available;
in response to determining that at least a second channel of the specified HD is available, assigning the selected second group call to the second channel; and
streaming voice and data corresponding to the second group call to the specified HD through the second channel.

10. The method of claim 8, further comprising:
demultiplexing a number of call streams from the two or more second control devices; and
multiplexing a call stream from the specified HD and duplicate the call stream into multiple streams for transmission to respective ones of the two or more second control devices.

11. The method of claim 8, further comprising:
displaying, on a display, an identification of the two or more group calls and available channels of the specified HD for selection of one of the group calls as the first group call and assignment of the first group call to the first channel of the specified HD.

12. The method of claim 8, wherein the selecting and assigning comprises:
receiving a selection signal from the specified HD, the selection signal configured to provide at least one of:
selection of the first group call from the two or more group calls; or
assignment of the first group call to the first channel of the specified HD.

13. The method of claim 12, further comprising:
translating call group names or identifiers corresponding to the two or more group calls from text to voice; and
transmitting the translated call group names or identifiers to the specified HD.

14. The method of claim 12, wherein the selection signal is received in response to a user input received at the specified HD.

15. A method for a multi-call system, the method comprising:
determining whether a first control device (CD) is communicatively coupled with no hearing device (HD), one HD, or more than one HD;
in response to determining that the first CD is communicatively coupled with a specified one HD, designating the first CD as a target CD that is allowed to simultaneously engage with a plurality of group calls;
in response to designating the first CD as the target CD, communicatively connecting the first CD to a plurality of call groups that correspond to the plurality of group calls, each call group comprising a second CD communicatively coupled with a plurality of HDs; and
directing a first call stream of a first group call to the specified HD, the first group call corresponding to a first call group selected from the plurality of call groups.

16. The method of claim 15, further comprising:
directing different call streams simultaneously to each available audio channel of the specified HD, the different call streams corresponding to group calls of different call groups selected from the plurality of call groups.

17. The method of claim 15, further comprising:
demultiplexing a plurality of call streams from the plurality of call groups; and
multiplexing a call stream from the specified HD and duplicating the call stream into multiple streams for transmission to different connected call groups.

18. The method of claim 15, further comprising:
displaying, on the first CD, available call groups and available audio channels of the specified HD for selection of one of the call groups as the first call group and assignment of an available audio channel of the specified HD to the first call stream.

19. The method of claim 15, wherein the specified HD is configured to select the first group call via a gesture on a specific audio channel device component of the specified HD.

20. The method of claim 19, wherein the first CD is configured to transmit a call group name or identifier that is translated from text to voice by the first CD and received by the specified HD.

* * * * *